US008279759B1

(12) United States Patent
Jones

(10) Patent No.: US 8,279,759 B1
(45) Date of Patent: Oct. 2, 2012

(54) PROTOCOL INTER-WORKED PING MECHANISM

(75) Inventor: Lawrence W. Jones, Woburn, MA (US)

(73) Assignee: Verizon Services Corp., Ashburn, VA (US)

( * ) Notice: Subject to any disclaimer, the term of this patent is extended or adjusted under 35 U.S.C. 154(b) by 1479 days.

(21) Appl. No.: 11/368,520

(22) Filed: Mar. 7, 2006

Related U.S. Application Data

(60) Provisional application No. 60/659,285, filed on Mar. 7, 2005.

(51) Int. Cl.
*H04L 12/26* (2006.01)

(52) U.S. Cl. ........ 370/248; 370/249; 370/252; 709/224; 714/716

(58) Field of Classification Search ............... 370/241.1, 370/254, 255, 241–252, 465–475; 709/204, 709/224–227, 238–246, 200; 714/25, 47.1, 714/712–717, 736–742
See application file for complete search history.

(56) References Cited

U.S. PATENT DOCUMENTS

| | | | | |
|---|---|---|---|---|
| 5,475,679 A * | 12/1995 | Munter | ...................... | 370/395.4 |
| 6,873,599 B1 * | 3/2005 | Han | ............................... | 370/249 |
| 6,965,577 B1 * | 11/2005 | Murphy | ........................ | 370/255 |
| 7,286,537 B2 * | 10/2007 | Roh | ............................... | 370/392 |
| 7,945,656 B1 * | 5/2011 | Remaker | ....................... | 709/224 |
| 2003/0210698 A1 * | 11/2003 | Rouleau | ........................ | 370/397 |
| 2004/0165534 A1 * | 8/2004 | Claseman | .................. | 370/241.1 |
| 2006/0013145 A1 * | 1/2006 | Boodaghians | ................ | 370/249 |
| 2006/0143309 A1 * | 6/2006 | McGee et al. | ................ | 709/250 |
| 2006/0203808 A1 * | 9/2006 | Zhang et al. | .................. | 370/352 |
| 2007/0025256 A1 * | 2/2007 | Hertoghs et al. | ........... | 370/236.2 |
| 2008/0304420 A1 * | 12/2008 | Deragon et al. | ............. | 370/249 |

OTHER PUBLICATIONS

"MAC Address"; Feb. 13, 2005; Wikipedia.*
"2.4 IP Routing"; Feb. 15, 2005; Linux Network Administrators Guide; Section 2.4.4.*
Postel; "RFC792—Internet Control Message Protocol"; Sep. 1, 1981; Networking Group RFC; pp. 14-15.*

* cited by examiner

*Primary Examiner* — Habte Mered

(57) ABSTRACT

In one embodiment, a system includes a first network device configured to communicate on a first communication layer, and a second network device configured to communicate on a second communication layer. The system further includes a router communicatively coupled to the first and second network devices through at least one network path. The at least one router includes a ping inter-working unit configured to support the transmission of a message between the first and second network devices through the at least one network path.

36 Claims, 6 Drawing Sheets

FIG. 3 (50): Frame Header 52 | IP Header 54 | ICMP Message Type 8 bits 56 | ICMP Message Code 8 bits 58 | ICMP Checksum 16 bits 60 | ICMP Identifier 16 bits 62 | Protocol Interworked Ping Extensions 20 Octets 66 | Optional Data (remaining bits) 64

FIG. 3A PIE-REQ Extensions (70): Target IP Address (4 Octets IPv4) 72 | OAM Specific Extensions (12 Octets) 74 | Reserved (4 Octets)

FIG. 3B PIE-REPLY Extensions (80): Target IP Address (4 Octets IPv4) 82 | PIE-REQ Rcvd Timestamp (4 Octets) 84 | OAM Loopback Send Delta Timestamp (2 Octets) 86 | OAM Loopback Returned Timestamp (4 Octets) 88 | PIE-REPLY Send Delta Timestamp (2 Octets) 89 | Reserved (4 Octets)

FIG. 3C PIE-STATUS Extensions (90): Target IP Address (4 Octets IPv4) 92 | PIE-STATUS Status-Code (1 Octet) 94 | Reserved (15 Octets)

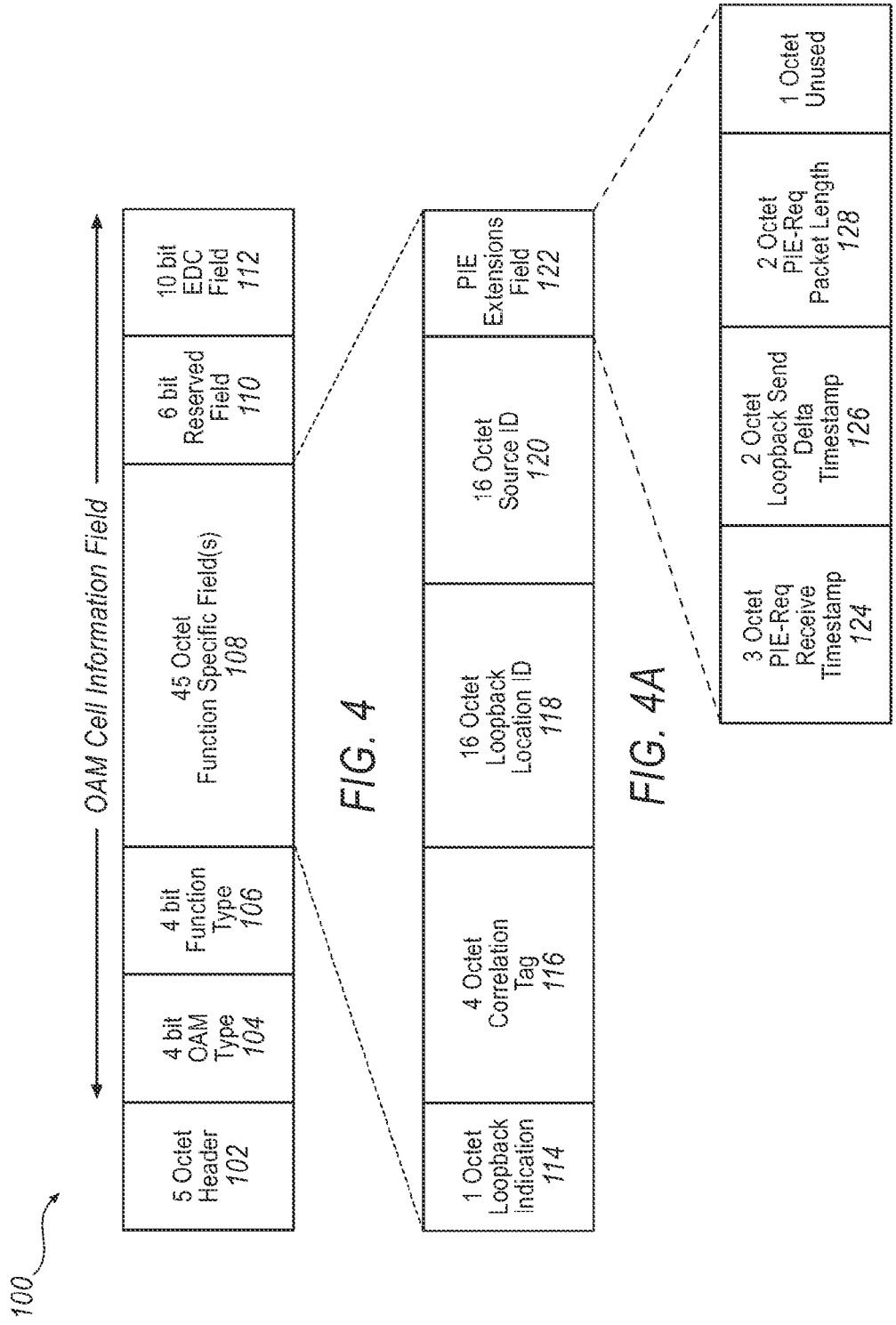

PROTOCOL INTER-WORKED PING MECHANISM

CROSS-REFERENCE TO RELATED APPLICATIONS

This application claims priority to U.S. Provisional Application Ser. No. 60/659,285, by Lawrence W. Jones filed on Mar. 7, 2005, and entitled PROTOCOL INTER-WORKED PING MECHANISM, the contents of which is hereby incorporated by reference in its entirety.

BACKGROUND

In its initial stages of infancy the telecommunications industry was entirely closed. Every manufacturer had its own proprietary set of communication standards. A subsequent push for open standards by industry leaders led to an explosion of new, open standards that define everything from telecommunication operating systems and digitally encoded voice streams, to IP telephony (i.e., phone and facsimile over the Internet). Among the industry's open standards is the Open Systems Interconnection (OSI) model developed by the International Standard Organization. The OSI model is the only internationally accepted framework for telecommunication standards.

The OSI model organizes the communications process into seven different categories and places these categories into a layered sequence based on their relation the user. Generally, layers 7 through 4 deal with end to end communications between a message source and a message destination, while layers 3 through 1 deal with network access such as data transmission and routing. Of particular interest here are layers 3 and 2, the Network layer and the Data Link layer, respectively.

Each layer in the OSI model operates under a different protocol (i.e., a set of rules governing the format for the exchange of messages). In most cases, the Network layer operates under what is called the Internet Protocol (IP), which provides end to end communication between host machines that are uniquely distinguished by their individual IP addresses. In other words, each host machine, server, or router within an IP network is IP capable, and individually identifiable by its own IP address.

The fundamental unit of information passed across the Internet in an IP communication is an IP datagram. The IP datagram contains the source and the destination address along with the data and a number of fields, which define the length of the datagram, the header checksum, and the flags that indicate whether the datagram has been fragmented.

The Data Link layer operates under any number of protocols including, but not limited to, Asynchronous Transfer Mode (ATM), Frame Relay, and Ethernet. A link layer can be thought of as providing a transport service to its upper layers across sub-networks or subnets (i.e., Wide Area Networks (WANs) or Local Area Networks (LANs)). An IP datagram may traverse several subnets from an IP source to its IP destination. A Data Link layer protocol provides a delivery service to the Network layer within the context of a given subnet.

Over the past several years, the demand for telecommunication services such as broadband access (i.e., through cable modems and digital subscriber lines (DSL)) and virtual private inter-connect services (i.e., through an Asynchronous Transfer Mode (ATM) Cell Relay, or a Frame Relay network), has continued to grow with an emerging acceleration for broadband IP services (e.g., IP Virtual Private Network (IP-VPN)). As service providers rollout these services, they have encountered a demand for performance guarantees of those services, particularly for business customers that rely on mission critical and distributed applications. To meet these demands, many service providers now provide operational and performance guarantees for specific metrics such as: network uptime, mean time to repair (MTTR), average packet latency, and bounded packet loss ratios. These parameter values for metrics are typically specified and guaranteed in the form of a Service Level Agreement (SLA). The SLA is in effect, a contract between the service provider and the customer, where the provider agrees to meet a given set of performance objectives. The SLA generally provides detailed language of what the performance objectives are and what credit the customer can receive if the provider network does not meet those objectives.

Broadband service is generally provided from an IP backbone through several subnets to a broadband access device that is located at or near the customer premise. The broadband access device is generally connected to a customer provided router or modem, each of which is located within the customer premise. Because the service provider does not have control over customer provided equipment (CPE), the scope of the SLA often terminates at the broadband access device (i.e., the demarcation point) and does not extend into the CPE domain.

Some key metrics for the SLA's can be measured using what is known in the IP Network as a "ping" command. The ping command sends a "signal", which is generally referred to as an Internet Control Message Protocol (ICMP) Echo Request Packet, to a destination IP address and waits for an ICMP Echo Reply. This reply, or lack thereof, may be used to determine and quantify some of the metrics for the SLA. The problem, however, is that the ping command only works on IP capable devices that have an IP address. Therefore, it is not possible with the existing OSI configuration for a service provider to "ping" from a provider server or router directly to the broadband access device, because broadband access devices operate under Data Link layer (layer 2) protocols and are generally not IP capable devices. Even in cases where the broadband access devices and CPE routers are integrated, fire-walling functions may prohibit such devices from responding to ping requests from external and/or unknown IP devices. Similarly, it is not possible for a service provider to "ping" from an IP host or router to layer 2 network elements within a particular subnet, even though such network elements may support the analogous OAM function (such as an OAM loopback).

Analogous to a "ping" command, the Data Link layer generally employs what is referred to as an Operations, Administration, and Maintenance (OAM) loopback function, which provides network fault indication, performance information, and diagnostic functions within the Data Link layer. The communications standard implemented in the Data Link layer depends on the link layer protocol. For example, many broadband access networks implement Asynchronous Transfer Mode (ATM), however, other protocols including, but not limited to, Frame Relay, Ethernet, or Multiple Protocol Layer Switch (MPLS) may be used.

Because each OSI model layer implements a different communications protocol, testing and operations management functions like the "ping" command and the OAM loopback function are unrecognizable by devices in differing layers. In fact, hosts and routers in the IP Network layer are generally unaware of Data Link layer elements such as switches and multiplexers. Accordingly, there is a need for a system and method that is capable of cross layer communication in an OSI model network such that testing and operation commands such as the "ping" mechanism are recognizable to elements in other layers.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical reference numbers designate identical or similar elements.

FIG. 3 is a representation of an ICMP message format with protocol inter-worked extensions, according to an embodiment;

FIG. 3A is a representation of an extension for a protocol inter-worked echo request, according to an embodiment;

FIG. 3B is a representation of an extension for a protocol inter-worked echo reply, according to an embodiment;

FIG. 3C is a representation of an extension for a protocol inter-worked echo status, according to an embodiment;

FIG. 4 is a representation of an OAM cell format with extensions, according to an embodiment;

FIGS. 4A-B are representations of OAM cell format extensions, according to an embodiment;

DETAILED DESCRIPTION OF PREFERRED EMBODIMENTS

Introduction

Figure 1:
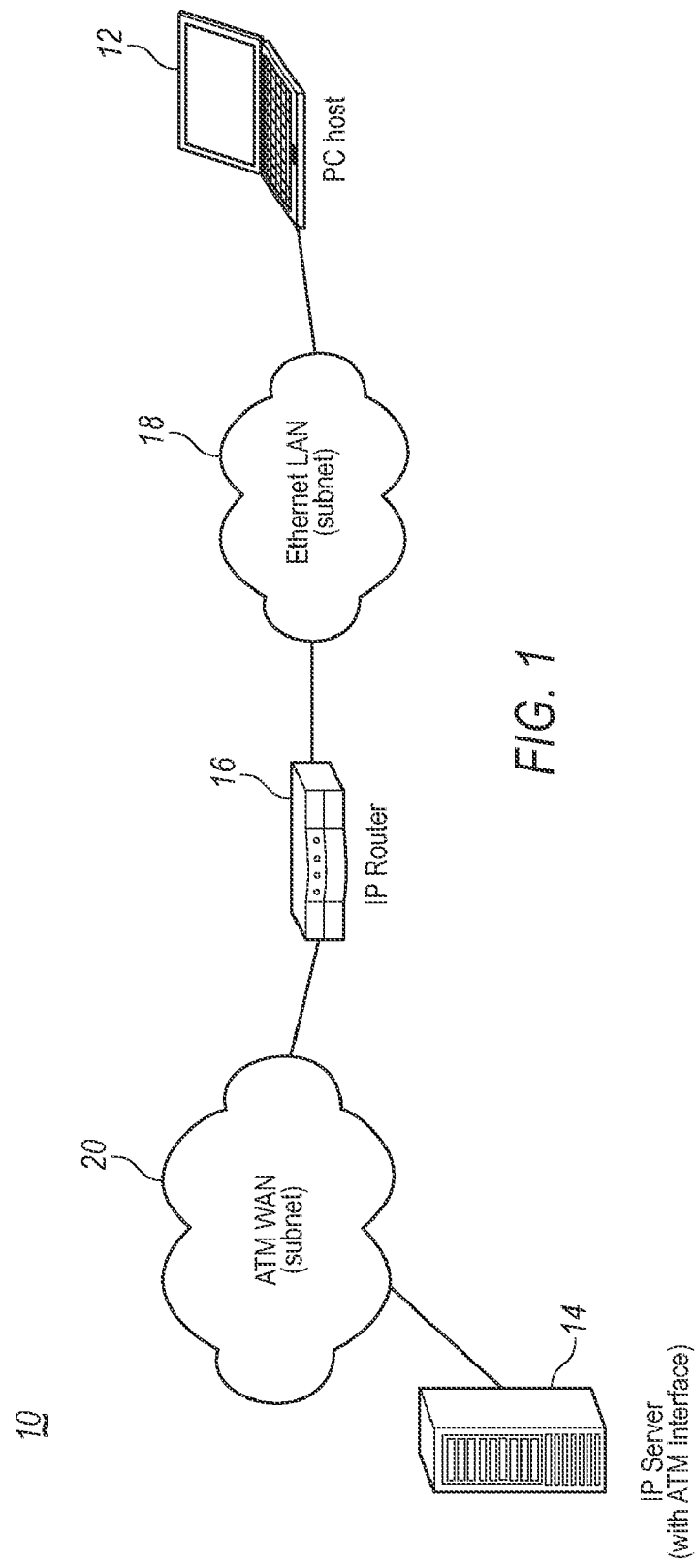
FIG. 1 illustrates an exemplary portion of a communications network, according to an embodiment.

A preferred system and method are described herein that perform testing and operation management functions between multiple layers in a communications network. The system is referred to as a "protocol inter-worked ping mechanism" and provides a method for inter-working between an IP layer, which implements an Internet Control Message Protocol (ICMP), and a Data Link layer implementing an Operations, Administration, and Maintenance (OAM) loopback function.

The preferred system includes an IP service gateway router configured with a ping inter-working unit (PIWU) that translates modified ICMP messages (e.g., ping commands using an IP Network layer protocol) so that they can be routed to, and acknowledged by, a Data Link layer device (i.e., a device using a link layer protocol such as ATM or Frame Relay) over a network path (i.e., a path between two network devices). The preferred method includes modifying ICMP messages to include new ICMP message "types" that enable the PIWU to translate the message into a format that is identifiable by a Data Link layer protocol. This includes defining and standardizing new fields in both the ICMP protocol and the Data Link layer OAM protocols (i.e., Asynchronous Transfer Mode (ATM), Frame Relay, or Ethernet). In this way, a ping server in the IP Network layer is able to "ping" a Data Link layer element, which was previously unavailable using conventional ping systems and methods.

In known broadband access configurations, an Internet Control Message Protocol (ICMP) is essential for hosts and/or routers that implement an IP protocol. In general, the embodiments described herein implement version four ("IPv4") and/or version six ("IPv6") of the ICMP as specified in IETF RFC 792, and IETF RFC 2463, respectively, the contents of which are hereby incorporated herein by reference in their entirety. One of ordinary skill in the art understands, however, that the principles disclosed herein can be applied to other and subsequent versions of the ICMP and IP protocol.

The primary role for an ICMP is to provide a means to communicate error and control information in IP networks. For example, if a router cannot route an IP packet or datagram, the router can inform the source host via a "destination unreachable" ICMP message using an appropriate code value. One of the most common uses of the ICMP protocol is to test for reach-ability and measure round-trip response time (RTT) to/from a remote host by invoking the ICMP "echo request" and "echo reply" message types (i.e., the "ping" command). Many systems support some implementation of the "ping" command, which sends an ICMP echo request to a specified destination host and waits for a reply. Upon receiving that reply (within a predetermined time limit), the source machine can compute the send/receive time differential to measure the round-trip latency. If the reply is not received, the source detects that the destination host/router is currently unreachable or not responding. Ping commands rely on the requirement that any ICMP enabled machine that receives an ICMP "echo request" message is to respond with an "echo response" message returned to the request sender.

Of particular interest here is the application of a ping function to monitor the packet latency and packet loss metrics for broadband access services. Broadband access services generally provide high-speed access for a customer to the global Internet and/or virtual private inter-connect services such as an IP-VPN service. Some of the commonly available broadband access services today are Asymmetrical Digital Subscriber Line (ADSL), Symmetrical Digital Subscriber Line (SHDSL), Broadband Wireless Internet access, Cable Modem Internet access, and a Fiber to the Premise (FTTP) service, which is an emerging broadband access service based on Passive Optical Network (PON) technology.

System Overview

FIG. 1 illustrates an exemplary portion of a network 10 having a host personal computer (PC) 12 in communication with an IP server 14 through an IP router 16. The host PC 12 resides on an Ethernet Local Area Network (LAN) subnet 18, while the IP server 14 resides on an Asynchronous Transfer Mode (ATM) Wide Area Network (WAN) 20.

Figure 2:
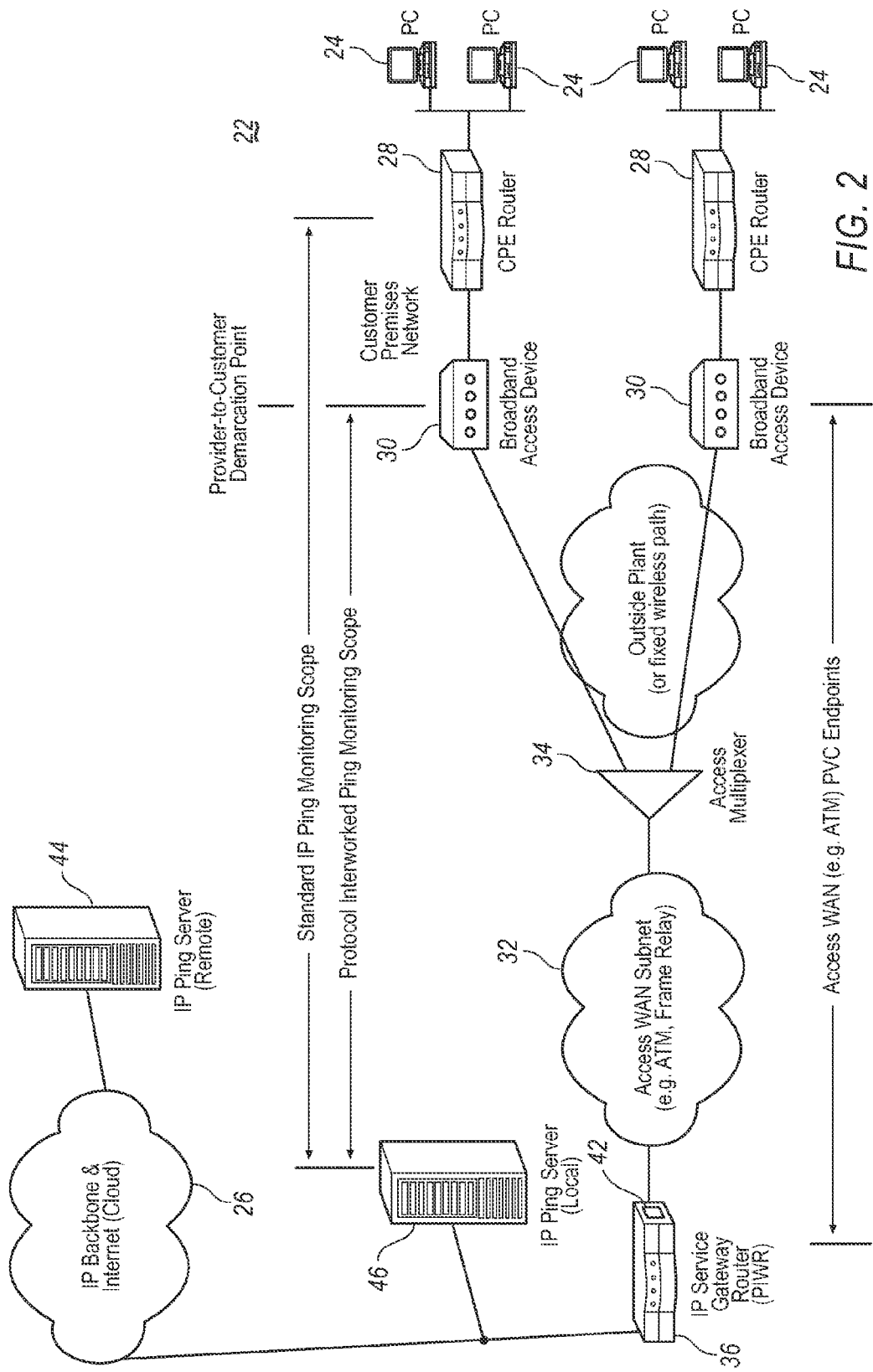
FIG. 2 illustrates an exemplary broadband access network, according to an embodiment.

FIG. 2 illustrates an exemplary architecture for a broadband access network 22 wherein customer PCs 24 are connected to an IP backbone 26 through at least one customer provided equipment (CPE) router 28 and broadband access device 30. The broadband access device 30 defines the demarcation point between the customer and the broadband access service provider and provides a connection from the customer to the IP network through an access WAN subnet 32 and an access multiplexer 34. Broadband access device 30 is generally a Data Link layer element and will be referenced as such hereinafter.

The typical broadband access network architecture conforms to the model depicted in FIG. 2. Each broadband access service employs a broadband access device 30, which is particular to the defining technology of that service. For example, the access device for ADSL is an ADSL ATU-R modem, the access device for Cable Modem Internet access is a cable modem, and the access device for FTTP is an Optical Network Termination (ONT) unit. A link layer (e.g. ATM Frame Relay) permanent virtual channel (PVC) connection (i.e., an ATM connection where switching is performed on the virtual path or virtual channel identifier fields located within each ATM cell format) is typically provisioned through the access WAN subnet 32 and terminated at an IP service gateway router 36. The IP service gateway router 36, in turn, provides the nexus from the broadband access network on to an IP service domain and the global Internet. For many service offerings, the broadband access device 30, a physical and Data Link layer device, represents the demarcation between the service provider network and customer premises network domains. As described above, the equipment that lies within the customer premises network is denoted customer premises equipment (CPE). Since the provisioning and management of CPE is typically not within the control of the service provider, the performance of CPE network cannot be guaranteed. Thus the scope of an SLA should preferably terminate at the demarcation point and not extend to the customer CPE domain.

In an exemplary embodiment, routers perform the IP layer to Data Link layer inter-worked ping function, i.e. the "protocol inter-worked ping". The ping inter-worked routers (PIWR) 36 include a ping inter-working unit (PIWU) 42 that performs a specific inter-working function at the Data Link layer interface of a PIWR 36. Note that for the broadband access monitoring application of FIG. 2, the IP service gateway router functions as a PIWR 36. The PIWU 42 can either be dedicated hardware logic or implemented via software/firmware at the PIWR 36 egress ports providing the Data Link layer interfaces.

By industry standards, ICMP messages are carried in standard IP datagrams or packets and so the routing decision is the same for ICMP datagrams as for any other IP datagram. This behavior is exploited to enable a Data Link layer network element (e.g., broadband access device 30) to be reached by an IP layer ping server 44 that sits in the IP cloud 26, even though the ping server 44 is unaware of how to address the Data Link layer network element. Connection between the IP layer and the Data Link layer is achieved, however, by leveraging the OAM loopback capability of a given Data Link layer combined with some extensions to the ICMP message set. The IP ping server 44, or any other ping server 46 in network 22, only needs to supply a destination IP address of the appropriate interface port of the PIWR that it desires to perform the ping inter-working function. IP routers typically have unique IP address assigned to each of its interface ports. As described above, implementation of the inter-working ping mechanism requires the definition and standardization of new fields in both the IP protocol (ICMP standard) and the Data Link layer protocol (OAM loopback function), each of which is described in detail below.

Internet Control Message Protocol (ICMP)

FIG. 3 illustrates an exemplary ICMP message 50 as modified for the inter-working ping mechanism. The standard fields include the frame header 52, IP header 54, ICMP message type 56, ICMP message code 58, ICMP checksum 60, ICMP identifier 62, and optional data fields 64 as described in RFC 792 and/or RFC 2463, both of which have been incorporated herewith by reference. To implement the inter-worked ping mechanism, new ICMP message "types" must be added to the standard ICMP configuration. Each new message represents a new value for the ICMP message "type" field 56 and must be designated and standardized. The new message types are the "PIE-Req" (protocol inter-worked echo request), and "PIE-Reply" (protocol inter-worked echo reply), and the "PIE-Status" (protocol inter-worked echo status).

In addition to defining new ICMP message types, the standard ICMP message is further modified to include a protocol inter-worked ping extension field 66. FIG. 3A illustrates an exemplary extension 70 for an ICMP protocol inter-worked echo request (PIE-Req) that defines a target IP address 72 and an OAM specific extensions field 74. In practice, there are several routers along a network path from an IP server to a Data Link device of interest that may support the protocol inter-worked ping function. Thus, unlike a standard ICMP echo request where the destination IP address denotes the IP device expected to reply, the protocol inter-worked PIE-Req is destined for a particular router (PIWR 36) that will perform the ping inter-working function. Once the PIWR 36 receives the PIE-Req message it reads the target IP address 72 from the PIE-Req message to determine which interface (e.g. ATM egress port) and sub-interface (e.g. ATM PVC on the ATM egress port) to forward the PIE-Req message to. Like traditional IP datagrams, the egress interface and sub-interface are determined by a switch/router table lookup. Thus, the target IP address 72 serves as a virtual destination IP address to allow the PIWR to determine the particular interface (and sub-interface) to perform the OAM loopback function on. For the application shown in FIG. 2, the target IP address 72 could be set to the IP address of CPE router 28. The PIWU 42 in the egress port of the PIWR 36 terminates the PIE-Req message and translates it into a corresponding OAM loopback message. In other words, the target IP address 72 "targets" a particular IP device that requires a packet traversal across the Data Link layer device of interest. This in turn allows the PIWR 36 to select an appropriate interface, which is assumed to contain a PIWU 42.

In an alternative embodiment, the respective roles of the destination IP address in the PIE-Req header 54 and the target IP address 72 in the PIE-Req ICMP extensions 70 can be reversed. In this case, each PIWR 36 inspects the target IP address 72 of each PIE-Req message and looks for a match to its own IP address. If a match is found, then the PIWR 36 performs the ping inter-working function at an interface (and sub-interface) dictated by the destination IP address in the PIE-Req IP packet header 54.

The OAM specific extensions 74 facilitate the translation of the request into a message that is commensurate with the Data Link layer protocol. For example, in the protocol inter-worked ping to ATM OAM loop-back, explicit data values placed directly into the standard OAM loop-back cell fields can be communicated to the PIWU 42 performing the inter-working function. This might be used, for example, to specify whether a virtual channel/path (VCNP) "segment" or VCNP "end-to-end" loop-back is performed, or to explicitly provide a value for the location ID field of the loop-back cell. It also could be used to specify whether a VP or VC OAM loop-back is to be performed. The specific configuration of the OAM loopback cell is detailed in the paragraphs below.

FIG. 3B shows an exemplary ICMP PIE-Reply Extension field 80 that includes a target IP address 82, a PIE-Req received timestamp 84, an OAM loopback delta timestamp 86, an OAM loopback returned timestamp 88, and a PIE-Reply delta timestamp 89. These time-stamps enable the calculation of various metrics including, but not limited to, average packet latency. Each timestamp has at least a sub-millisecond precision. The "PIE-Req received timestamp" 84 represents the absolute time that the PIWR 36 received the PIE-Req message. The "OAM loopback send delta timestamp" 86, is the time differential between when the PIE-Req message was received by the PIWR 36 and when a corresponding loopback was sent by the PIWU 42 in that PIWR 36. This time differential represents the required processing time for the PIWR 36 (and its PIWU 42) to determine the appropriate port to perform the loopback function on, and to perform the ping inter-working operation (This is the processing time between 600-1a and 600-1b which is discussed in FIG. 5). The "OAM loopback returned timestamp" 88, is the absolute time at which the OAM loopback completed its round-trip traversal and returned back to the PIWU 42. The "PIE-Reply delta timestamp" 89 is the time differential between the OAM loop-back return 88 and the time the PIE-Reply message sent back to the ping server 44. This time differential represents the processing time required by the PIWR 36 (and its PIWU 42) to process the returned OAM loopback message, instantiate a PIE-Reply message, and send that PIE-reply message back to the ping server 44 (This is the processing time between 600-2b and 600-2a, which is discussed in FIG. 5).

The equations below represent the round-trip time (RTT) from the ping server to the PIWR 36 (Equation 1), the RTT for the OAM loopback (Equation 2), the overall RTT (Equation 3), and the effective RTT of the network. In each of these Equations, Ta represents the time the PIE-Req was sent from the ping server 44 to the PIWR 36, and Tb represents the time the PIE-Reply was received at the ping server 44 from the PIWR 36. References to timestamps refer to those depicted in FIGS. 3B and 4B.

$$(Ta-PIE\text{-}Req\ Rcvd\ (84))+(Tb-(OAM\ Rcvd\ (124)+ PIE\text{-}Reply\ Send\ Delta\ (89))); \quad \text{Equation (1)}$$

$$(PIE\text{-}Req\ Rcvd\ time\ (84)+OAM\ send\ delta\ time\ (86, 126)-OAM\ Rcvd\ time\ (124)); \quad \text{Equation (2)}$$

$$Tb-Ta; \quad \text{Equation (3)}$$

and $$Tb-Ta-(OAM\ Send\ Delta\ Time\ (86,126)+PIE\text{-}Reply\ Send\ Delta\ Time\ (89)). \quad \text{Equation (4)}$$

In an alternative embodiment, the ICMP message further includes a protocol inter-worked status extension 90. As shown in FIG. 3C, the status extension 90 includes a target IP address 92 and a status code 94. In cases where there is an error condition, the status code 94 provides that information from the PIWR 36 to the ping server 44. These conditions may include situations where the PIWR 36 is busy, unavailable, or the ping protocol inter-working function is not supported or is disabled at a particular router from which the service is requested from. If the status code 94 is not implemented, no information will be returned and in these cases, the lack of a response will be viewed as a dropped message, unreachable PIWR 36, or an unreachable Data Link layer device.

OAM Loopback

Like the ICMP, the inter-working ping mechanism requires modifications to the standard OAM cell information field. The following example illustrates the modifications made to an OAM loopback for an ATM subnet, however, one of ordinary skill in the art understands that the only requirement is that the protocol implemented be capable of an OAM loopback function. Therefore, any Data Link layer protocol that provides an analogous OAM loopback function, such as an ATM, Frame Relay, Ethernet, or Multiple Protocol Layer Switch (MPLS) may be used.

Figure 5:
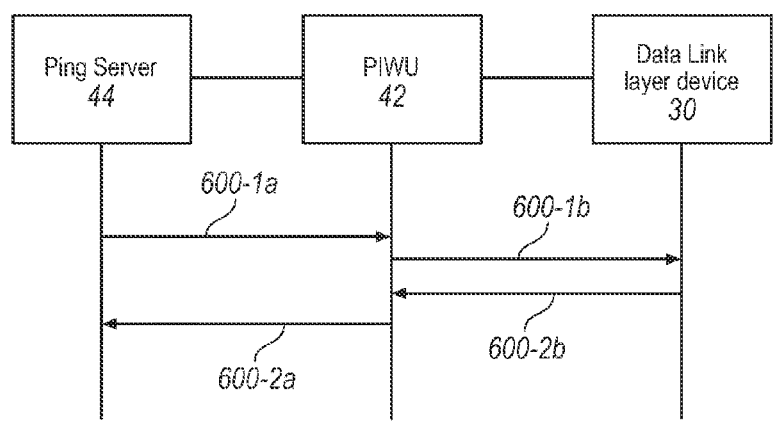
FIG. 5 illustrates an exemplary flow of protocol inter-worked echo messages between certain elements of FIG. 2, according to an embodiment.
Figure 6:
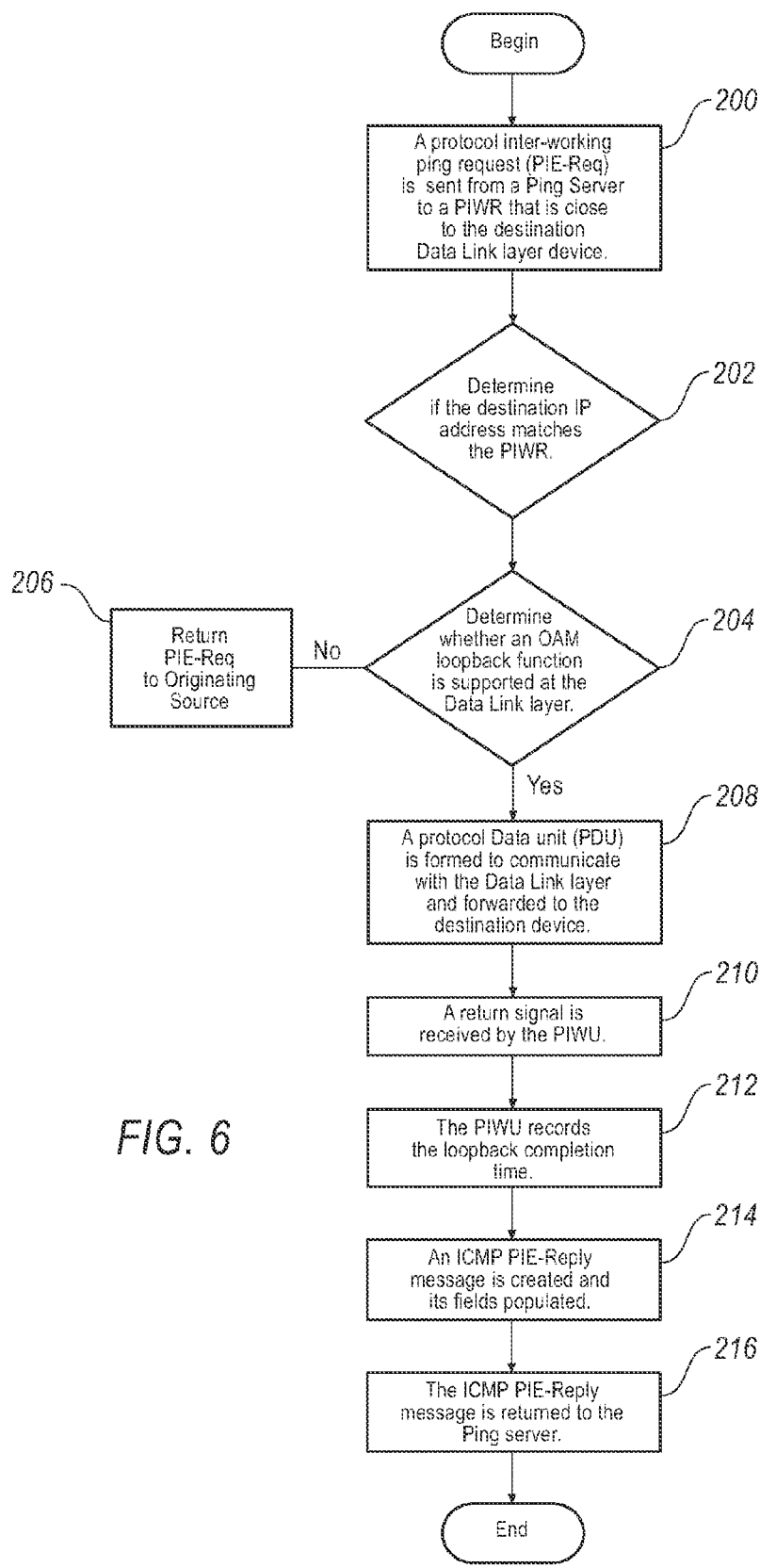
FIG. 6 is a flow chart illustrating an exemplary method for a protocol inter-worked ping mechanism, according to an embodiment.

FIG. 4 illustrates an ATM OAM cell format 100 according to the ATM protocol specified in ITU-T 1.610, which is incorporated herein by reference in its entirety. The OAM cell 100 includes a header 102, an OAM type 104, a function type 106, function specific fields 108, and a reserved field 110. A breakout of the function specific field 108 is shown in FIG. 4A and includes a loopback indication 114, a correlation tag 116, a loopback location ID 118, a source ID 120, and a PIE extensions field 122. The PIE extensions field 122, as shown in FIG. 4B, defines a field for a PIE-Req timestamp 124, which refers to the time that the PIE request (sent by the ping server 44) was received by the PIWR 36. Fields 126 and 128 are defined for the OAM loopback send delta time-stamp 126 and the PIE-Req packet length 128, respectively. The loopback delta timestamp 126 records the time difference between when the PIE request was received by the PIWR 36 and the time when the loopback message is sent by the PIWU 42 towards the Data Link layer device. The PIE-Req packet length specifies the length of the incoming request packet so that a reply of the same length may be sent. Although FIG. 4B indicates that seven Octets (i.e., an eight bit byte) are used to implement these fields, however, one of ordinary skill in the art understands that the system may be configured to accomplish the same functionality using less than 7 Octets. The value in placing these fields in the OAM loobback message is that it allows the PIWU 42 to construct a PIE-Reply (which transports this information back to the ping server 44) upon return of the loopback message from the Data Link layer device without having to maintain state. This relieves the PIWU 42 of demanding use of memory resources for cases where many Data Link layer devices are pinged concurrently Exemplary Process FIGS. 5 and 6 illustrate an exemplary process for an inter-working ping mechanism between an IP Network layer and a Data Link layer that is defined by an ATM protocol. References to physical components refer to the exemplary components illustrated in FIG. 2. The process described herein is exemplary and presented as a tool to explain the process of a protocol inter-working ping mechanism. Accordingly, Data Link protocols other than an ATM, such as, but not limited to, Frame Relay, Ethernet, or MPLS may be used.

Referring to FIG. 5, a "ping" command travels from ping server 44 in the form of a request to the ping inter-working unit (PIWU) 42 (600-1a). The request is received by the PIWU 42 and forwarded to the destination Data Link layer device in the form of an OAM loopback message commensurate with the data link technology, in this case, the broadband access device 30 (600-1b). The access device 30 receives the request and returns a reply to the PIWU 42 (600-2b). The PIWU 42 translates and forwards the reply to the originating ping server 44 (600-2a).

FIG. 6 is a flow diagram illustrating a set of exemplary steps for a protocol inter-working ping. At step 200, a protocol inter-working ping request (PIE-Req) is sent from a ping server 44 to a PIWR 36 that is located proximate to the destination Data Link layer device 30. When PIWR 36 receives an ICMP PIE-Req datagram from ping server 44, it first determines at step 202 if the destination IP address in the IP header 54 of PIE-Req matches that of the PIWR 36 itself. If so, that PIWR 36 knows it has been requested to serve the PIE-Req and performs a ping inter-working operation. In this case, it treats the target IP address 72 encapsulated in the PIE-Req. message as if it were the destination IP address 54 of the PIE-Req packet and determines the next hop interface (and sub-interface such as the appropriate virtual channel (VC) on the interface) via its routing table (not shown), as it would for any IP datagram having a destination IP address equivalent to the PIE-Req target IP address. However, since the received datagram is an ICMP PIE-Req message, the PIWU 42 serving the egress port of the PIWR 36 first determines at step 204 whether the egress interface supports an OAM loopback function at the Data Link layer. Note that the PIWR 36 can be provisioned to support a predetermined set of Data Link layer loopback standards and only when one of those standards can be applied, will the PIWU 42 perform the ping inter-working function. Otherwise, an ICMP PIE Reply or PIE Status message will be reflected at step 206, to the originating source of the PIE-Req, with a ICMP message "code" 58 value set; indicating a warning or error that no compatible Data Link layer was reached for the inter-working to occur. Note that it is a design option either to use PIE-Status messages or just PIE-Reply message with pre-defined values for ICMP message code to indicate such error or status conditions. If all the useful error conditions can be coded in the ICMP message code, one may chose to use PIE-Reply messages with such codings instead of PIE-Status message (eliminating the need to implement the PIE-Status ICMP extensions).

If the PIWU 42 is operating at an egress interface with Data Link layer technology capable of an OAM loopback function, a link layer loopback protocol data unit (PDU) is formed at step 208 commensurate with that link layer and forwarded out of that interface. The loopback PDU must include a certain number of bits to denote the size of the original PIE-Req message and a timestamp to store the time the loopback message is sent. These are defined as the ICMP PIE-Req size and forward timestamp fields, respectively. Note such fields (or their operational equivalents) in many cases may not be supported by the OAM standard for a given Data Link layer (assuming that link layer supports an OAM loopback function at all). In those cases, some enhancement to the OAM standard of the Data Link layer of interest may be required as described above.

Upon completion of the OAM link layer loopback operation at step 210 (i.e., a return signal is received from the Data Link layer device 30), the following operations are performed by the PIWU: (1) at step 212 the timestamp of the loopback completion time is recorded; (2) at step 214 an ICMP PIE-Reply message is created and its fields populated; (3) at step 216 the ICMP PIE-Reply message is returned to the source IP address (i.e., the ping server 44) of the originator of the corresponding ICMP PIE-Req message. The PIE-Reply message contains an ICMP message "code" value indicating the inter-worked loopback test was successful. The ICMP PIE-Reply also includes four fields to store the various timestamps as depicted in FIG. 3. Recall that the Data Link layer loopback send timestamp was encapsulated in the Data Link layer loopback PDU thus available for writing in the ICMP PIE-Reply message upon its return in the Data Link layer loopback PDU.

As previously described, the forwarding decision for a protocol inter-worked ping datagram is determined by the standard routing operation of the PIWR 36. At the PIWU 42 in an ATM egress interface of a PIWR 36, the ICMP PIE-Req, is inter-worked to an permanent virtual path (PVP) or a permanent virtual channel (PVC) ATM OAM loopback cell (the VP and VC are defined and specified in ITU-T 1.610 and referred therein as F4 and F5). Referring back to FIGS. 4 and 4A, the ATM OAM loopback cell is an ATM OAM cell with an OAM type coding value "0001", and function type coding value of "1000". The loopback cell is sent from the PIWR 36 to the ATM Data Link layer network element (e.g. ATM switch, multiplexer, ADSL modem, FTTP ONT, etc. . . . ) that terminates the PVC (or PVP) and supports the standard loopback. In this disclosure, it is assumed that the all 1's "loopback location ID" value is used in the loopback cell (unless explicitly specified otherwise by the OAM specific extensions filed of the PIE-Req depicted in FIG. 3). This value indicates the loopback is performed at the terminating endpoint of the PVC (or PVP) and thus, end-to-end, as opposed to segment loopback is in effect. However, the extensions to segment level loopback in the link layer is within the scope of this disclosure. Note that it is only required that the ATM network element which terminates the PVC (or PVP) traversed by the IP data stream of interest, supports the ITU-1.610 OAM standard (which includes the ATM loopback function). To support preservation of the ICMP PIE-Req size and loopback time stamp recording operations, the ITU-T 1.610 OAM standard is extended by defining and standardizing a range of bits in the "reserved bytes of its OAM loopback cell format for those two fields (i.e. "size" and "send delta timestamp" fields must be defined). Such standardization would of course remain backwards compatible because the ATM network elements which perform the loopback are agnostic to these fields. Note, however, that the inter-worked ping can still operate with out the use of those fields. In that case, no recorded timestamps would be returned in the ICMP PIE-Reply message and the size of the PIE message would have to be set to a predetermined fixed size. In that case, no recorded timestamps would be returned in the ICMP PIE-Reply message and the size of the PIE message would either have to be remembered by the PIWU (i.e. store the size of the PIE-Req in memory) or have to be set to a predetermined fixed size.

It should be understood by those skilled in the art that various alternatives to the embodiments of the invention described herein may be employed without departing from the spirit and scope of the invention as defined in the following claims. It is intended that the following claims define the scope of the invention and that any method and system within the scope of these claims and their equivalents be covered thereby. This description of the preferred embodiments should be understood to include all novel and non-obvious combinations of elements described herein, and claims may be presented in this or a later application to any novel and non-obvious combination of these elements. The foregoing embodiments are illustrative, and no single feature or element is essential to all possible combinations that may be claimed in this or a later application. Where the claims recite "a" or "a first" element of the equivalent thereof, such claims should be understood to include incorporation of one or more such elements, neither requiring nor excluding two or more such elements.

The invention claimed is:

1. A system, comprising:
a first network device capable of being addressed on a first communication layer;
a second network device capable of being addressed on a second communication layer but not on said first communication layer; and
a router communicatively coupled to said first and second network devices through at least one network path, said router configured to:
receive a message from said first network device comprising a first layer communication identifier of a target device, said target device being distinct from and communicatively coupled to said router through said second network device; and
determine a second layer communication identifier corresponding to said second network device according to said first layer communication identifier of said target device, wherein said router includes a ping inter-working unit that is configured to support the transmission of said message between said first and second network devices through said at least one network path, and wherein said first network device is configured to transmit said message to said second network device by way of said ping inter-working unit, said second network device being configured to reflect said message back to said first network device by way of said ping inter-working unit.

2. The system of claim 1, wherein said first communication layer is a Network layer.

3. The system of claim 2, wherein said Network layer implements an Internet Protocol that supports Internet Control Message Protocol (ICMP).

4. The system of claim 1, wherein said second communication layer is a Data Link layer.

5. The system of claim 4, wherein said Data Link layer implements an Asynchronous Transfer Mode, a Frame Relay, an Ethernet, or a Multiple Protocol Layer Switch (MPLS) link layer protocol.

6. The system of claim 1, wherein said message is modified to include one of a protocol inter-worked echo request type, a protocol inter-worked echo reply type, and a protocol inter-worked echo status.

7. The system of claim 1, wherein said message is modified to include at least one extension field.

8. The system of claim 7, wherein said at least one extension field includes information specific to a communications protocol implemented by said second communication layer.

9. The system of claim 7, wherein said at least one extension field includes a status code corresponding to a protocol inter-worked echo request.

10. The system of claim 7, wherein said at least one extension field includes at least one timestamp.

11. The system of claim 7, wherein said at least one extension field includes a target IP address field.

12. The system of claim 11, wherein said target IP address field is configured to provide a direction to said message along said network path.

13. The system of claim 10, wherein said at least one timestamp is used to determine a round-trip response time.

14. The system of claim 10, wherein said at least one timestamp is used to determine a latency.

15. The system of claim 1, wherein said first network device is configured to
record a first timestamp corresponding with the transmission of said message from said first network device,
record a second timestamp corresponding with said first network device receiving the reflected said message, and
use said first timestamp and said second timestamp to determine a latency.

16. The system of claim 1, wherein said ping inter-working unit is configured to
record a first timestamp corresponding with said ping inter-working unit receiving the outgoing said message to said second network device,
record a second timestamp corresponding with said ping inter-working unit receiving the reflected said message, and
use said first timestamp and said second timestamp to determine a latency.

17. A router, comprising:
a protocol inter-working ping unit configured to support the transmission of a message between a first network device capable of being addressed on a first communication layer, and a second network device capable of being addressed on a second communication layer but not on said first communication layer, through at least one network path;
wherein said protocol inter-working ping unit is configured to:
receive a message from said first network device comprising a first layer communication identifier of a target device, said target device being distinct from and communicatively coupled to said protocol inter-working ping unit through said second network device, and
determine a second layer communication identifier corresponding to said second network device according to said first layer communication identifier of said target device, and
translate and route said message to said second network device, said second network device being configured to reflect said message back to said first network device by way of said ping inter-working unit.

18. The router of claim 17, wherein said first communication layer is a Network layer.

19. The router of claim 18, wherein said Network layer implements Internet Protocol that supports Internet Control Message Protocol (ICMP).

20. The router of claim 17, wherein said second layer is a Data Link layer.

21. The router of claim 19, wherein said Data Link layer implements an Asynchronous Transfer Mode, a Frame Relay, an Ethernet, or a Multiple Protocol Layer Switch (MPLS) link layer protocol.

22. The router of claim 17, wherein said message is modified to include at least one extension field.

23. The router of claim 22, wherein said at least one extension field includes information specific to a communications protocol implemented by said second communication layer.

24. The router of claim 22, wherein said at least one extension field includes a status code corresponding to a protocol inter-worked echo request.

25. The router of claim 22, wherein said at least one extension field includes at least one timestamp.

26. A method, comprising:
receiving a request message from a first network device to be sent to a second network device at a router on at least one network path, said message comprising a first layer communication identifier of a target device distinct from and communicatively coupled to said router through said second network device, said first network device capable of being addressed on a first communications layer and said second network device capable of being addressed on a second communications layer but not on said first communication layer;
forming a protocol data unit at said router that is commensurate with said second communications layer;
determining a second layer communication identifier corresponding to said second network device according to said first layer communication identifier of said target device;
addressing said request message to said second layer communication identifier; and
forwarding said message from said router to said second network device by way of a ping inter-working unit of said router, said second network device capable of reflecting said message back to said first network device by way of said ping inter-working unit.

27. The method of claim 26, further comprising:
receiving a return message at said router from said second network device;
creating a reply message; and transmitting said reply message from said router to said first network device.

28. The method of claim 26, further comprising:
recording a first timestamp corresponding with the step of sending said request message from said first network device,
recording a second timestamp corresponding with said first network device receiving a reply message, and
using said first timestamp and said second timestamp to determine a latency.

29. The method of claim 26, further comprising:
determining if a destination IP address of a header of said message matches an address for said router.

30. The method of claim 26, further comprising:
determining what protocol is supported by said second communications layer.

31. The method of claim 26, further comprising:
determining a direction for said message along said network path based upon a target IP address of said message.

32. The method of claim 26, further comprising:
recording at least one timestamp corresponding to said steps of sending, forwarding, receiving, and transmitting said message.

33. The method of claim 32, further comprising:
calculating a roundtrip response time based upon said at least one timestamp.

34. The system of claim 1, wherein said router is further configured to:
interwork said message into a second layer communication message; and
send said second layer communication message to said second network device.

35. A method, comprising:
receiving, at a router, a ping request message from a server, said ping request message comprising an internet protocol address of a target internet protocol device, said target internet protocol device being distinct from said router and communicatively coupled to said router through a data link layer device that does not have an internet protocol address;
determining, by the router, the data link layer device to which said target device is communicatively coupled;
interworking said ping request message into an operations, administration, and maintenance (OAM) loopback function message analogous to an Internet Control Message Protocol (ICMP) echo request;
sending said OAM loopback message to said data link layer device;
receiving an OAM loopback message reply from said data link layer device, said reply message being analogous to an ICMP echo reply message; and
sending a ping reply message to said server, said ping reply message comprising timing information based in part on said OAM loopback reply message.

36. The method of claim 35, wherein said data link layer device is a broadband access device.

* * * * *